US007585165B2

(12) United States Patent
Nakai et al.

(10) Patent No.: US 7,585,165 B2
(45) Date of Patent: Sep. 8, 2009

(54) POWDER MOLDING DIE APPARATUS AND METHOD OF MOLDING FOR OBTAINING POWDER MOLDING PRODUCT

(75) Inventors: Takashi Nakai, Niigata (JP); Kinya Kawase, Niigata (JP)

(73) Assignee: Mitsubishi Materials PMG Corporation, Niigata (JP)

( * ) Notice: Subject to any disclaimer, the term of this patent is extended or adjusted under 35 U.S.C. 154(b) by 721 days.

(21) Appl. No.: 10/547,047

(22) PCT Filed: Mar. 26, 2004

(86) PCT No.: PCT/JP2004/004303

§ 371 (c)(1),
(2), (4) Date: Aug. 26, 2005

(87) PCT Pub. No.: WO2004/087407

PCT Pub. Date: Oct. 14, 2004

(65) Prior Publication Data

US 2006/0147570 A1 Jul. 6, 2006

(30) Foreign Application Priority Data

Mar. 28, 2003 (JP) ............................ 2003-092386

(51) Int. Cl.
*B29C 43/02* (2006.01)

(52) U.S. Cl. ........................ 425/100; 425/103; 425/355

(58) Field of Classification Search ................. 425/100, 425/102–103, 78, 352–355, 405.1–405.2; 419/65, 66

See application file for complete search history.

(56) References Cited

U.S. PATENT DOCUMENTS 5,700,492 A * 12/1997 Morimoto et al. ........... 425/100
7,083,760 B2 * 8/2006 Kondo et al. .................. 419/65

FOREIGN PATENT DOCUMENTS

| | | | |
|---|---|---|---|
| JP | 44-9295 | | 4/1969 |
| JP | 63-41103 | A | 2/1988 |
| JP | 07304049 | | 11/1995 |
| JP | 09-272901 | A | 10/1997 |
| JP | 2002-129201 | A | 5/2002 |
| JP | 3309970 | B2 | 7/2002 |
| WO | WO 01/43900 | A1 | 6/2001 |

* cited by examiner

*Primary Examiner*—Yogendra Gupta
*Assistant Examiner*—Thu Khanh T Nguyen
(74) *Attorney, Agent, or Firm*—Darby & Darby PC

(57) ABSTRACT

A surface treatment layer 11 is formed on a surface 10 of a through-hole 1 so that the surface 10 has an angle X of contact with solution L which is smaller than an angle Y of contact of a die 2 per se with the solution L. When the solution L is applied, the wetting action of the solution L relative to the through-hole 1 is improved so that the solution L can be extended over the surface treatment layer 11, eventually over the entire surface of the through-hole 1. Consequently, the entire surface thereof can be formed with a crystallized layer by performing water evaporation. As a result, molding at higher temperature can be realized, and high-density compacts can be stably obtained. Further, the solution L in which the lubricant is dissolved in a solvent into a homogeneous phase, is applied to a molding portion 1A, and then evaporated to thereby form crystals thereon, thus forming the crystallized layer.

8 Claims, 8 Drawing Sheets

POWDER MOLDING DIE APPARATUS AND METHOD OF MOLDING FOR OBTAINING POWDER MOLDING PRODUCT

CROSS-REFERENCE TO PRIOR APPLICATION

This is a U.S. National Phase application under 35 U.S.C. §371 of International Patent Application No. PCT/JP2004/004303 filed Mar. 26, 2004 and claims the benefit of Japanese Patent Application No. 2003-092386, filed Mar. 28, 2003, both of which are incorporated by reference herein. The International Application was published in Japanese on Oct. 14, 2004 as WO 2004/087407 A1 under PCT Article 21(2).

1. Field of the Invention

The present invention relates to a powder molding die apparatus and a method of molding for obtaining powder molding product.

2. Description of the Related Art

A green compact, which is used for the production of sintered products, is formed by pressing raw powders such as Fe-based powders, Cu-based powders or the like in a mold, and then a sintered body is formed through a sintering process. In the molding process, the compact undergoes a press-molding process, using a mold. At the time of the press-molding, however, a friction between a compact and a mold is generated. For this reason, when mixing raw powders, a water-insoluble fatty acid lubricant, such as zinc stearate, calcium stearate, lithium stearate, etc., is added so as to impart lubricity.

However, the method of applying a lubricant to raw powders has limitations of improvement of the density of a compact. Accordingly, in order to obtain a high-density compact, there is proposed a method for forming a compact which can make up for the lack of lubricity by applying the same lubricant as the one added to raw powders to a mold while reducing the amount of lubricant added to raw powders.

This conventional method of molding is disclosed in, for example, Japanese Registered Patent Publication No. 3309970 (see paragraphs 0012 and 0013). This method comprises steps of: applying water dispersed in a high fatty acid lubricant to an inner surface of a heated mold by a spray gun so as to coat the inner surface therewith; and press-molding metal powders by filling the metal powders in the mold and pressing the same at such a pressure that the high fatty acid lubricant is chemically bonded to the metal powders so as to produce a film of metallic soap, wherein the mold is heated, and the inner surface thereof is coated with the high fatty acid lubricant such as lithium stearate; heated metal powders are filled into this mold and are subjected to press-molding at such pressure that the high fatty acid lubricant is chemically bonded to the metal powders so as to produce the film of metallic soap, whereby the film of metallic soap is produced on the inner surface of the mold to thereby reduce the friction between the compact of the metallic powders and the mold, thereby enabling the reduction of force for ejecting the compact.

As the fact that the same lubricant as one added to the raw powders is used for the mold results in the use of the water-insoluble lubricant, the lubricant applied to the metal is applied in a solid powder state. For this reason, other lubricant application methods are also known, such as electrostatic application of lubricant powders or dry application of lubricant which is dispersed in water by detergent and then dried.

According to the above-mentioned conventional art where dispersion liquid of lubricant obtained by dispersing the same in water is applied to a mold, the dispersion liquid is repelled from the surface of the mold due to surface tension at the time of this application, so that there has been a problem that the dispersion liquid is not uniformly attached to the powder molding portion of the mold, i.e., to the surface of the through-hole thereof, and thus it becomes impossible to form a lubricating layer entirely on the surface of the molding portion (i.e., through-hole). This problem becomes particularly noticeable in the case of carrying out the warm forming at a high temperature of 150 Celsius degrees or above, thus having hindered further density growth in the past.

On the other hand, in the event that the dispersion liquid obtained by dispersing lubricant in water is applied to a mold by spraying, the dispersion liquid is liable to be attached not only to the molding portion but also to the upper surface of the mold or die. Since the upper surface of the die is the one on which a material supplying body that is normally called “feeder” or the like is allowed to slide, there have been concerns that raw powder tends to be easily caked due to the dispersion liquid being attached to the upper surface of the mold.

Also, in paragraph 0006 of Japanese Un-Examined patent publication No. 2002-129201 is disclosed a powder molding die apparatus, comprising a die that includes an inner hole for defining a contour of a compact and is made of a hard material, the die being fitted into an inner hole of a die holder having an inner hole, wherein the inner hole of the die is reverse-tapered toward a direction in which a compact is pulled out, while the surface of the die is formed with either a single or multiple coating layers consisting of at least one of TiC, TiN, $Al_2O_3$, TiCN, HfN, CrN, $W_2C$ and DLC, and wherein the die holder is made up of the material whose tempering temperature normally used is higher than that for the aforesaid coating process.

According to the conventional die whose surface is formed with either a single or multiple coating layers consisting of at least one of TiC, TiN, $Al_2O_3$, TiCN, HfN, CrN, $W_2C$ and DLC, however, dispersion liquid would not be uniformly attached to the surface of the through-hole thereof, although the improvement in abrasion resistance of the die and the lowered friction in the die surface could be achieved.

It is, accordingly, an object of the present invention to provide a powder molding die apparatus for forming a compact which enables the stable production of a high density compact by forming a lubricating layer on an entire surface of a molding portion.

It is another object of the present invention to provide a powder molding method which enables the stable production of a high density compact by forming a lubricating layer on an entire surface of a molding portion.

It is further an object of the present invention to provide a powder molding die apparatus which enables the stable production of a high density compact by forming a lubricating layer on an entire surface of a molding portion, wherein negative effect of lubricant on the surface of the die is eliminated.

SUMMARY OF THE INVENTION

In order to attain the above objects, a first aspect of the present invention proposes a powder molding die apparatus for powder molding, comprising: a die with a through-hole for forming a side of a compact, the through-hole being defined vertically through a upper surface of the die; a lower punch to be fitted into the through-hole from beneath; an upper punch to be fitted into the through-hole from above; a lubricant applying means for applying a lubricant to the through-hole, the lubricant applying means allowing the lubricant to be applied to the through-hole prior to filling a raw powder in the through-hole from above, with the lower punch being fitted therein, so that the upper punch is allowed to be fitted into the through-hole after filling the through-hole with the raw material to form a compact, wherein the through-hole is formed so as to have a smaller angle of contact with the lubricant than an angle of contact of the die itself with the lubricant.

According to the structure set forth in the first aspect, it is possible for the through-hole to have a smaller angle of contact with the lubricant attached to the through-hole, so that the wetting action of the lubricant relative to the through-hole is improved, thus allowing the lubricant to be extended entirely over the through-hole. Consequently, improved lubricating performance can be achieved at the time of powder molding.

A second aspect of the present invention proposes the powder molding die apparatus according to the first aspect, wherein the lubricant is either dispersion liquid or solution produced by dispersing or dissolving lubricant in water, while the through-hole is surface-treated to have a hydrophilic property.

Thus, the formation of a lubricating layer is ensured by evaporating the moisture content in the lubricant attached to the through-hole.

A third aspect of the present invention proposes the powder molding die apparatus according to the second aspect, wherein the through-hole is surface-treated so as to have a surface treatment layer formed by the coating of oxide, fluoride, nitride, chloride, sulfide, bromide, iodide, carbide, or hydroxide.

A fourth aspect of the present invention proposes the powder molding die apparatus according to the second aspect, wherein the through-hole is surface-treated so as to have a surface treatment layer formed by subjecting a coating of titania or zinc oxide to photocatalytic reaction by means of irradiation of light.

A fifth aspect of the present invention proposes the powder molding die apparatus according to the second aspect, wherein the through-hole is surface-treated so as to have a surface treatment layer formed by the creation of hydroxide by alkali or hydrothermal processing, or by sputterings with potassium ions or sodium ions.

A sixth aspect of the present invention proposes the powder molding die apparatus according to the second aspect, wherein said through-hole is surface-treated so as to have a surface treatment layer formed by making use of change in surface tension of solution through the formation of fine pores on the surface.

A seventh aspect of the present invention proposes a powder molding die apparatus, comprising: a die with a through-hole for forming a side of a compact, the through-hole being defined vertically through a upper surface of the die; a lower punch to be fitted into the through-hole from beneath; an upper punch to be fitted into the through-hole from above; a lubricant applying means for applying a lubricant to the through-hole, the lubricant applying means allowing the lubricant to be applied to through-hole prior to filling a raw powder in the through-hole from above, with the lower punch being fitted, so that the upper punch is allowed to be fitted into the through-hole after the filling of the raw powder, wherein the upper surface is formed so as to have a larger angle of contact with the lubricant than an angle of contact of the die itself with the lubricant.

According to the structure set forth in the seventh aspect, it is possible for the upper surface of the die to have a larger angle of contact with the lubricant attached thereto, so that the wetting action of the lubricant relative to the through-hole is reduced, thus allowing the lubricant to be repelled from the upper surface. Consequently, a raw powder to be filled can be prevented from being degraded.

An eighth aspect of the present invention proposes the powder molding die apparatus set forth in the seventh aspect, wherein the lubricant is either dispersion liquid or solution produced by dispersing or dissolving lubricant in water, while the upper surface is surface-treated to have water repellency.

Thus, the formation of a lubricating layer is ensured by evaporating the moisture content in the lubricant attached to the through-hole.

A ninth aspect of the present invention proposes the powder molding die apparatus according to the eighth aspect, wherein the upper surface is surface-treated with either a nonpolar substance or a substance with Si—H bond or C—H bond.

A tenth aspect of the present invention proposes a method of molding for obtaining a powder molding product, comprising the steps of: applying solution produced by dissolving lubricant in water or dispersion liquid produced by dispersing lubricant in water to the molding portion; evaporating a water content in the dispersion liquid or that of the solution to form a lubricating layer on the molding portion; filling a raw powder in a molding portion, and then fitting punches into the molding portion to form a powder molding product, wherein the dispersion liquid or the solution contains components for improving its wetting action to the through-hole.

According to the structure set forth in the tenth aspect, it is possible for the molding portion to have a smaller angle of contact with the solution or the dispersion liquid attached thereto, so that the wetting action of the solution or dispersion liquid relative to the molding portion is improved, thus allowing the solution or dispersion liquid to be extended entirely over the molding portion. Consequently, improved lubricating performance can be achieved at the time of powder molding.

An eleventh aspect of the present invention proposes the method for obtaining a powder molding product according to the tenth aspect, wherein the components for improving wetting action is surface acting agent.

DETAILED DESCRIPTION OF THE PREFERRED EMBODIMENT

Figure 1:
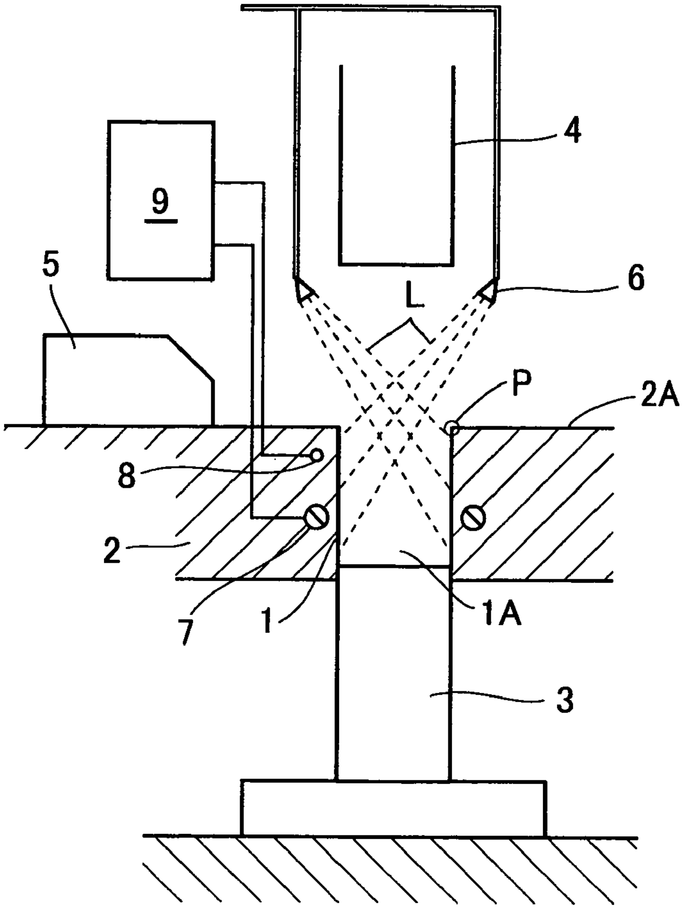
FIG. 1 is a schematic diagram showing a first process according to a first embodiment of the present invention.
Figure 1A:
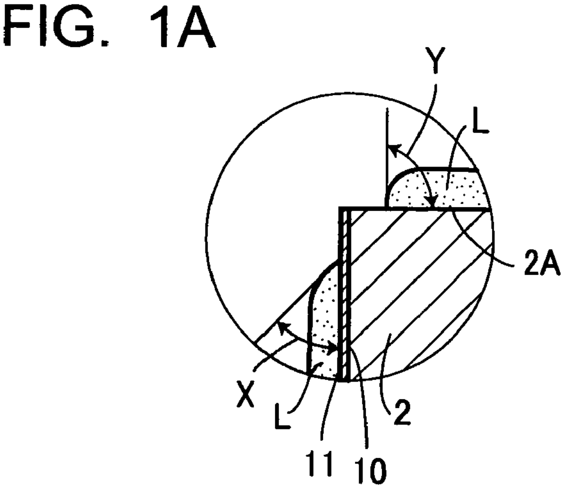
FIG. 1A is a partly enlarged cross-sectional view showing a part P of a die according to the first embodiment.

A first embodiment of the present invention will now be explained with reference to FIGS. 1 to 4. In FIG. 1A showing a first process, numeral 1 designates a through-hole formed vertically through the upper surface of a die 2 serving as a mold for forming sides of a compact A as a later-described powder molded body. A lower punch 3 is fitted into the through-hole 1 from the underneath thereof and an upper punch 4 is also fitted into the through-hole 1 from the above thereof. A feeder 5, which provides a raw powder M, is slidably provided on an upper surface of the die 2. Above the through-hole 1 is provided a spray member 6 serving as a solution applying means for spraying a solution L so as to attach the same to a molding portion 1A of the mold. The spray member 6 is arranged so as to face the through-hole 1, and is connected to a tank of the solution L (not shown) via an automatically openable and closable valve (not shown). Alternatively, the solution L may be replaced with dispersion liquid produced by dispersing the lubricant disclosed by the aforesaid Japanese Registered Patent Publication No. 3309970 in water. A heater 7 and a temperature detector 8 are provided around the periphery of the molding portion 1A for forming the compact A, the molding portion being defined by the through-hole 1 and the lower punch 3 engaged therewith. The heater 7 and the temperature detector 8 are connected to a temperature control device 9 serving as a temperature controlling means, which keeps temperature in the through-hole 1 higher than the evaporating temperature of the solution L, and lower than the melting temperature of the lubricant.

A surface 10 of the through-hole 1 is formed with a surface treatment layer 11 by hydrophilicity imparting treatment to the surface 10 for improving the wetting action of the solution L relative to the surface 10, or by arranging hydrophilic material thereon. An angle X of contact of the surface treatment layer 11 relative to the solution L is smaller than an angle Y of contact of the surface 10, which is made from the material of the die 2 itself, or of the upper surface 2A where the material is exposed, relative to the solution L (i.e., X<Y), thus enabling the said wetting action to be improved. It should be noted herein that these angles of contact X, Y are not measured under such condition as shown in FIG. 1 which are only schematically illustrated for the sake of explanation, but are measured under an equal condition, such as keeping the surface 10 and the upper surface 2A horizontally.

Specifically, the surface treatment layer 11 is formed by: the thermal spraying, PVD, CVD or shot peening of oxide, fluoride, nitride, chloride, sulfide, bromide, iodide, carbide, hydroxide and etc. having chemical bonds as shown in Table 1; subjecting the coating of titania, zinc oxides or the like to photocatalytic reaction by irradiating light thereto; creating hydroxide by alkali or hydrothermal treatment; the surface treatment by sputtering with potassium ions or sodium ions; and utilizing change in surface tension of the solution L by the formation of minute pores on the surface by spray coating or powder metallurgy die, whereby the surface treatment layer thus obtained allows the angle of contact of the solution relative to the surface 10 of the through-hole 1 to be made smaller, thereby improving the wetting action of the solution therein. Alternatively, the surface 10 of the through-hole 1 may undergo the removal of oily organisms through acid or flame processing, electrolytic polishing etc so that the angle of contact X may become small. If there causes no problem in strength, the die may preferably be formed from hydrophilic materials shown in Tables 1 and 2. Alternatively, metals such as iron or hard metal may have the substances shown in Table 1 dispersed therein to improve strength and hardness. Alloying with easily oxidizable metals such as Ti, V, Si, and Al, etc. to use as the material of the die is also effective to improve hydrophilic property. In the case of coating, the coating of iron or hard metal together with hydrophilic materials is desirable since such coating can satisfy both the long-duration and hydrophilicity of the die.

TABLE 1

Examples of Hydrophilic Substances

| Hydrophilic Bond Elements or Hydrophilic Substances | Approximate Ionicity of Bond | Principal Reason for Hydrophilic Property |
|---|---|---|
| Cs—F, Fr—F | 93% | due to large ionicity (polarity) of bonds |
| K—F, Rb—F | 92% | |
| Na—F, Ba—F, Ra—F | 91% | |
| Li—F, Ca—F, Sr—F | 89% | |
| Ac—F, lanthanoid-F | 88% | |
| Mg—F, Y—F, Cs—O, Fr—O | 86% | |
| Se—F, Hf—F, Th—F, K—O, Rb—O | 84% | |
| Zr—F, Pa—F, U—F, Na—O, Ba—O, Ra—O | 82% | |
| Be—F, Al—F, Ti—F, Ta—F, Mn—F, Li—O, Ca—O, Sr—O | 79% | |
| Nb—F, V—F, Cr—F, Zn—F, Ga—F, Ac—O, lanthanoid-O | 76% | |
| W—F, Cd—F, In—F, Mg—O, Y—O, Cs—O, Fr—O, Cs—N, Fr—N, Cs—Cl, Fr—Cl | 73% | |
| Mo—F, Fe—F, Tl—F, Si—F, Ge—F, Sn—F, Se—O, Hf—O, Th—O, K—N, Rb—N, K—Cl, Rb—Cl | 70% | |
| Re—F, Tc—F, Co—F, Ni—F, Cu—F, Ag—F, Hg—F, Pb—F, Sb—F, Bi—F, Zr—O, Pa—O, U—O, Na—N, Ba—N, Ra—N, Na—Cl, Ba—Cl, Ra—Cl, Cs—Br, Fr—Br | 67% | |
| B—F, As—F, Po—F, Be—O, Al—O, Ti—O, Ta—O, Mn—O, Li—N, Ca—N, Sr—N, Li—Cl, Ca—Cl, Sr—Cl, K—Br, Rb—Br | 63% | |
| P—F, Te—F, Nb—O, V—O, Cr—O, Zn—O, Ga—O, Ac—N, lanthanoid-N, Ac—Cl, lanthanoid-Cl, Na—Br, Ba—Br, Ra—Br | 59% | |
| Ru—F, Os—F, Rh—F, Ir—F, Pd—F, Pt—F, At—F, W—O, Cd—O, In—O, Mg—N, Y—N, Cs—N, Fr—N, Mg—Cl, Y—Cl, Cs—Cl, Fr—Cl, Li—Br, Ca—Br, Sr—Br, Cs—C, Fr—C, Cs—S, Fr—S,Cs—I, Fr—I | 55% | |

TABLE 2

Examples of Hydrophilic Substances

| Hydrophilic Bond Elements or Hydrophilic Substances | Approximate Ionicity of Bond | Principal Reason for Hydrophilic Property |
|---|---|---|
| Mo—O, Fe—O, Tl—O, Si—O, Ge—O, Sn—O, Se—N, Hf—N, Th—N, Se—Cl, Hf—Cl, Th—Cl, Ac—Br, lanthanoid-Br, K—C, Rb—C, K—S, Rb—S, K—I, Rb—I | 51% | due to large ionicity (polarity) of bonds |
| Au—F, Se—F, Re—O, Tc—O, Co—O, Ni—O, Cu—O, Ag—O, Hg—O, Pb—O, Sb—O, Bi—O, Zr—N, Pa—N, U—N, Zr—Cl, Pa—Cl, U—Cl, Mg—Br, Y—Br, Na—C, Ba—C, Ra—C, Na—S, Ba—S, Ra—S, Na—I, Ba—I, Ra—I | 47% | |
| B—O, As—O, Po—O, Be—N, Al—N, Ti—N, Ta—N, Mn—N, Be—Cl, Al—Cl, Ti—Cl, Ta—Cl, Mn—Cl, Se—Br, Hf—Br, Th—Br, Li—C, Ca—C, Sr—C, Li—S, Ca—S, Sr—S, Li—I, Ca—I, Sr—I | 43% | |
| P—O, Te—O, Nb—N, V—N, Cr—N, Zn—N, Ga—N, Nb—Cl, V—Cl, Cr—Cl, Zn—Cl, Ga—Cl, Zr—Br, Pa—Br, U—Br, Ac—C, lanthanoid-C, Ac—S, lanthanoid-S, Ac—I, lanthanoid-I | 39% | |
| Ru—O, Os—O, Rh—O, Ir—O, Pd—O, Pt—O, At—O, W—N, Cd—N, In—N, W—Cl, Cd—Cl, In—Cl, Be—Br, Al—Br, Ti—Br, Ta—Br, Mn—Br, Mg—C, Y—C, Cs—C, Fr—C, Mg—S, Y—S, Cs—S, Fr—S, Mg—I, Y—I, Cs—I, Fr—I | 35% | |
| Mo—N, Fe—N, Tl—N, Si—N, Ge—N, Sn—N, Mo—Cl, Fe—Cl, Tl—Cl, Si—Cl, Ge—Cl, Sn—Cl, Nb—Br, V—Br, Cr—Br, Zn—Br, Ga—Br, Se—C, Hf—C, Th—C, Se—S, Hf—S, Th—S, Se—I, Hf—I, Th—I | 30% | |
| General Substances Including Hydroxyl Group | | due to the inclusion of hydroxyl group |
| Oxides In General | | due to surface being turned to include hydroxyl |
| Water-Soluble Substances In General | | due to being soluble in water |
| Some Specific Oxides (e.g., titanium oxide, zinc oxide) | | due to photo-excitation |

In the first process, due to the heat of the heater 7 being pre-controlled by the temperature control system 9, the temperature of the surface 10 of the through-hole 1 is kept higher than the evaporating temperature of the solution L, and lower than the melting temperature of the lubricant beforehand. Then, the automatically openable and closable valve is opened to apply the solution L of the lubricant by spraying from the spray member 6 to the molding portion 1A of the die 2 heated by the heater 7, with the lower punch 3 being fitted into the through-hole 1 to define the molding portion 1A. At this moment, the angle X of contact of the solution L, which would be the angle Y of contact without the surface treatment layer 11, is allowed to be the smaller angle X owing to the surface treatment layer 11, thus allowing the solution L to be prevented from being repelled, to thereby be applied to the entire surface of the though-hole 1 and wet the same. As a result, the solution L is evaporated and dried out, and thus crystals are allowed to grow entirely on the surface treatment layer 11 of the through-hole 1, so that a crystallized layer B serving as a lubricating layer of the lubricant is uniformly formed.

Figure 2:
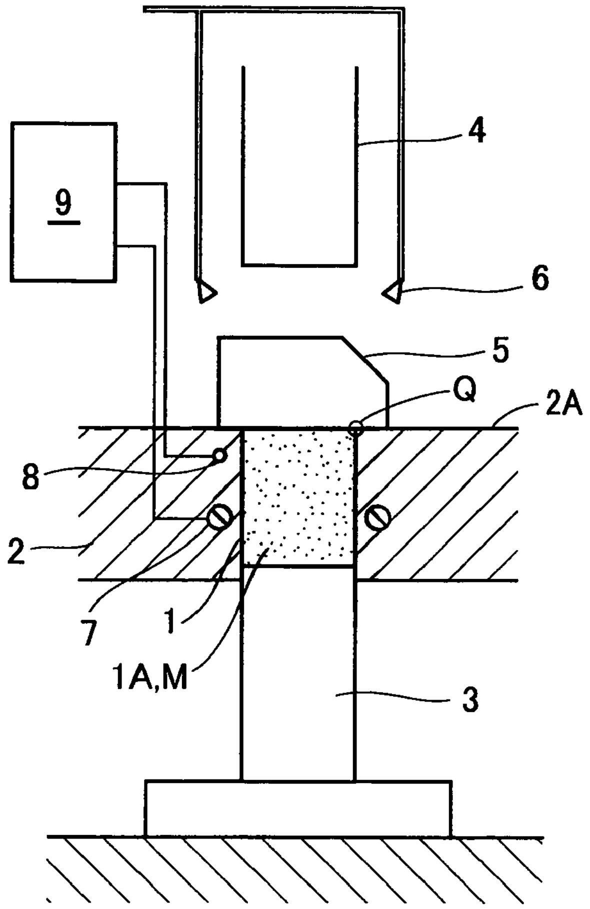
FIG. 2 is a schematic diagram showing a second process according to the first embodiment of the present invention.
Figure 2A:
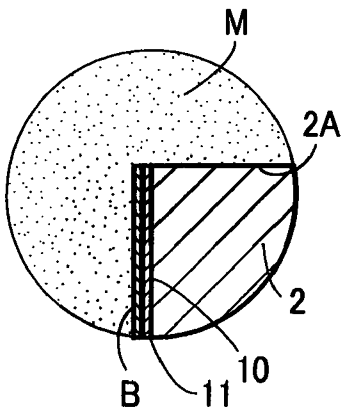
FIG. 2A is a partly enlarged cross-sectional view showing a part Q of a die according to the first embodiment.
Figure 3:
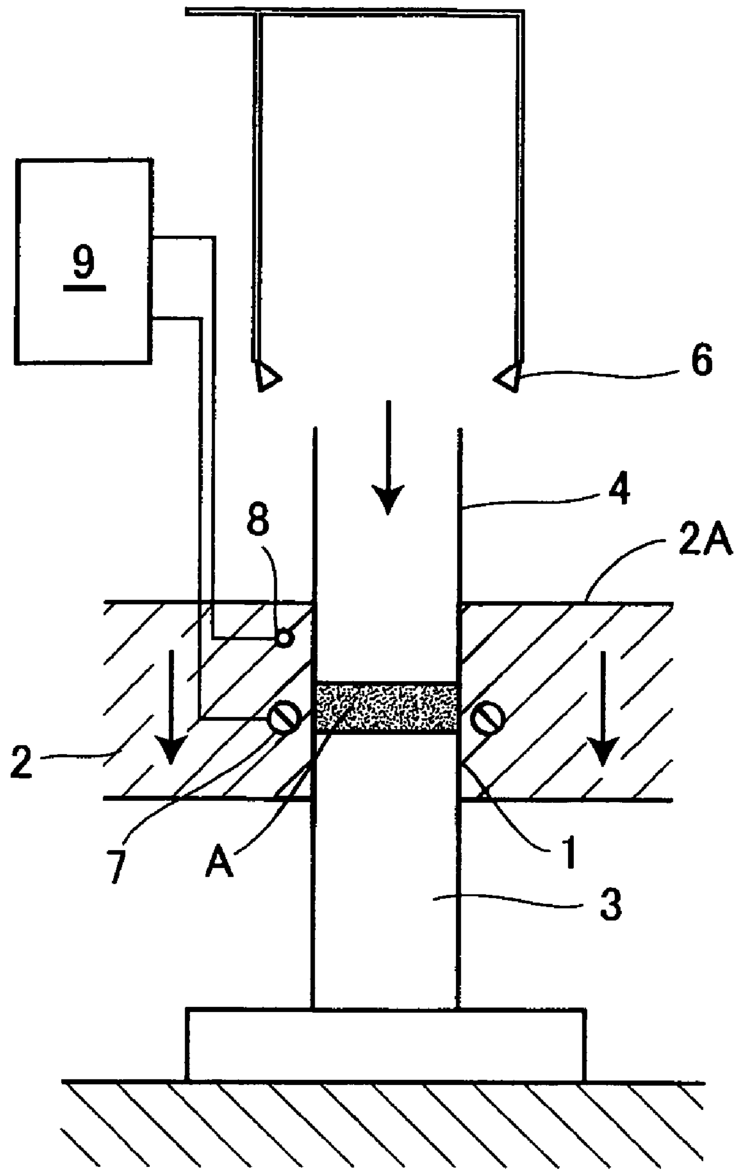
FIG. 3 is a schematic diagram showing a third process according to the first embodiment of the present invention.

Next, as illustrated in a second process shown in FIG. 2, the feeder 5 is moved forward so as to drop a raw powder M into the molding portion 1A to fill the same therewith. Subsequently, as illustrated in a third process shown in FIG. 3, the die 2 is moved downwardly, while the upper punch 4 is inserted into the molding portion 1A of the through-hole 1 from thereabove, so that the raw powder M is compressed in a manner that is sandwiched between the upper punch 4 and the lower punch 3. At this stage, a bottom end of the lower punch 3 is firmly held in position. In this third process, the material powder M is compressed by being pressed against the crystallized layer B formed of the lubricant with a lubrication property being imparted thereto by the layer B.

Figure 4:
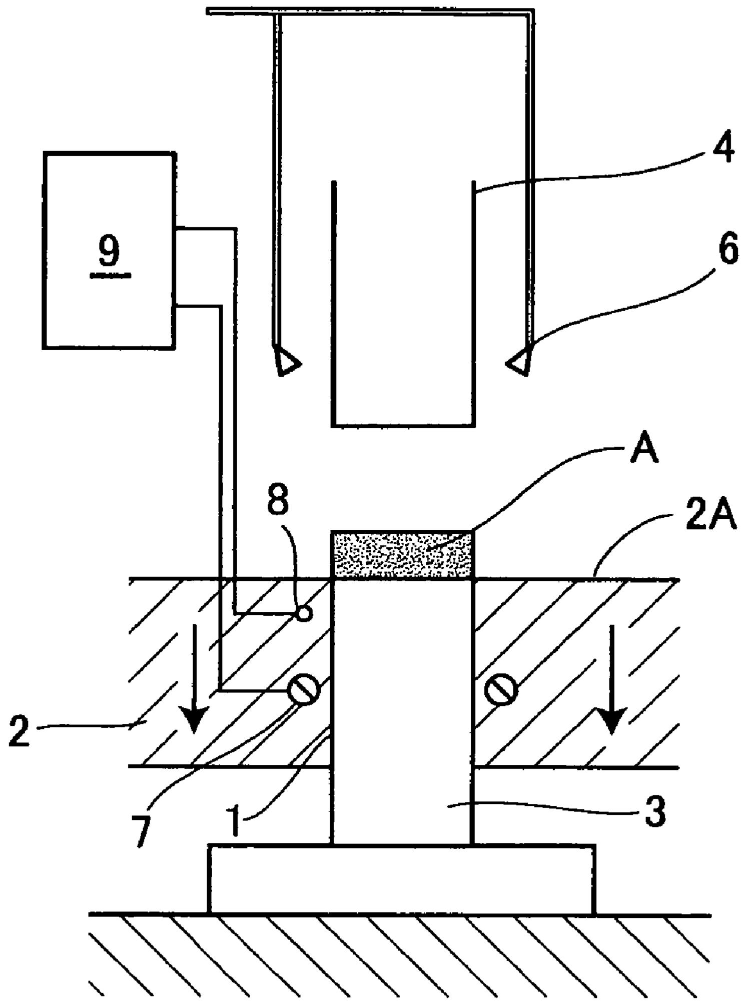
FIG. 4 is a schematic diagram showing a fourth process according to the first embodiment of the present invention.
Figure 5:
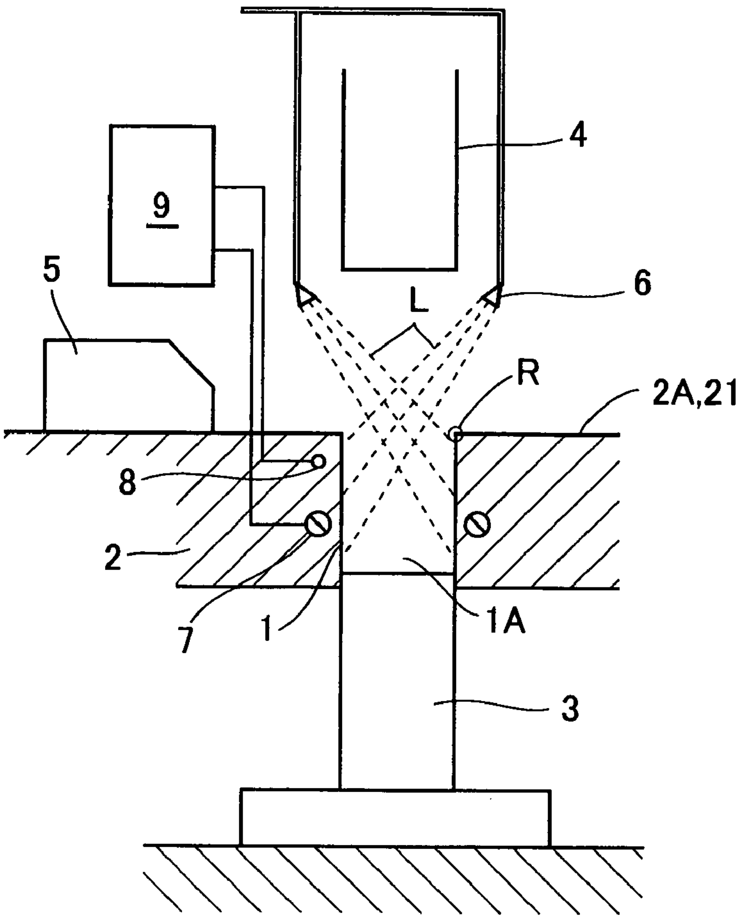
FIG. 5 is a schematic diagram showing a first process according to a second embodiment of the present invention.
Figure 5A:
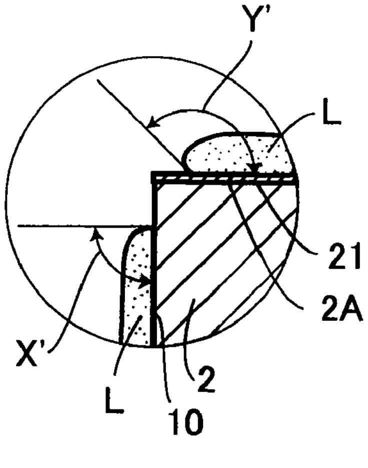
FIG. 5A is a partly enlarged cross-sectional view showing a part R of a die according to the second embodiment.
Figure 6:
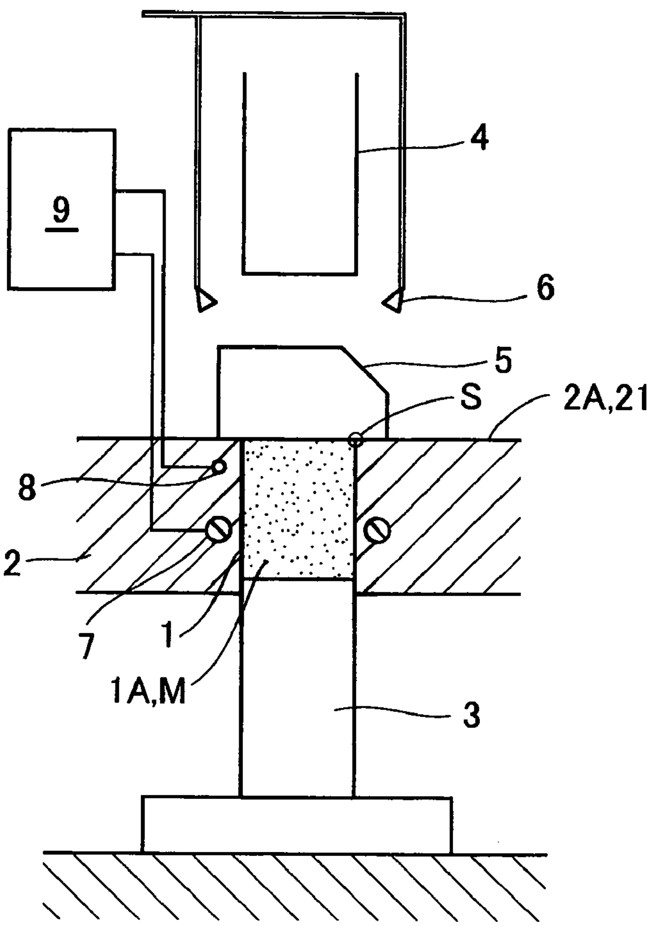
FIG. 6 is a schematic diagram showing a second process according to a second embodiment of the present invention.
Figure 6A:
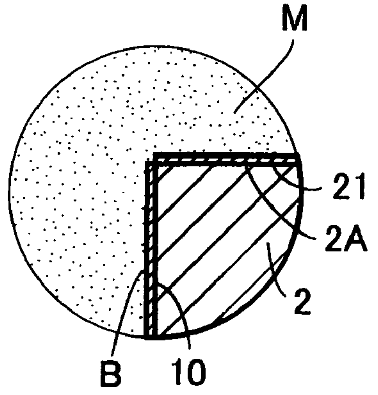
FIG. 6A is a partly enlarged cross-sectional view showing a part S of a die according to the second embodiment.
Figure 7:
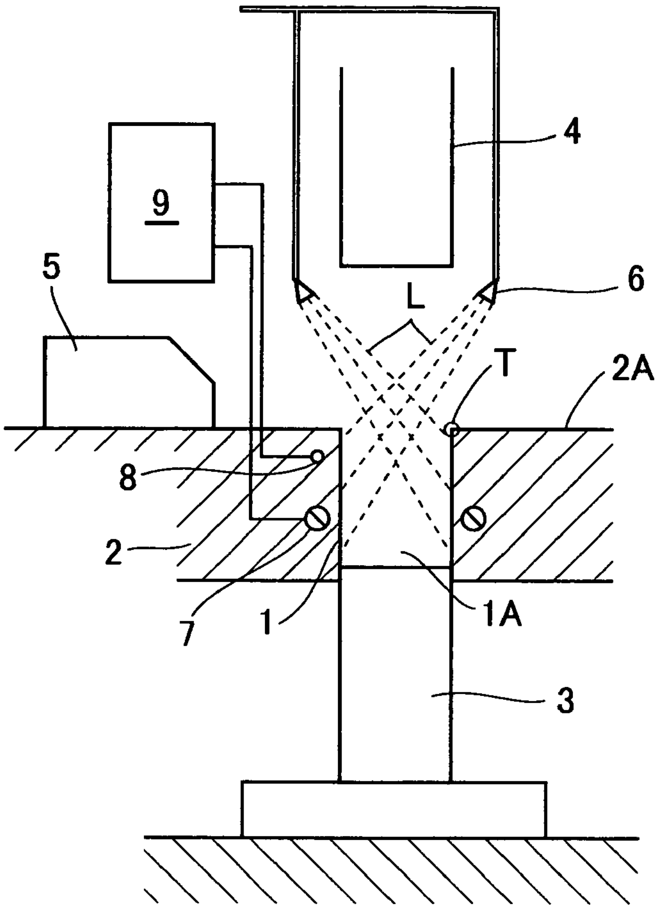
FIG. 7 is a schematic diagram showing a first process according to a third embodiment of the present invention.
Figure 7A:
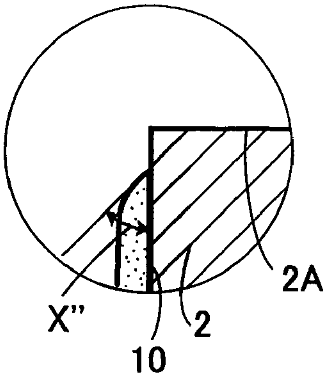
FIG. 7A is a partly enlarged cross-sectional view showing a part T of a die according to the third embodiment.
Figure 8:
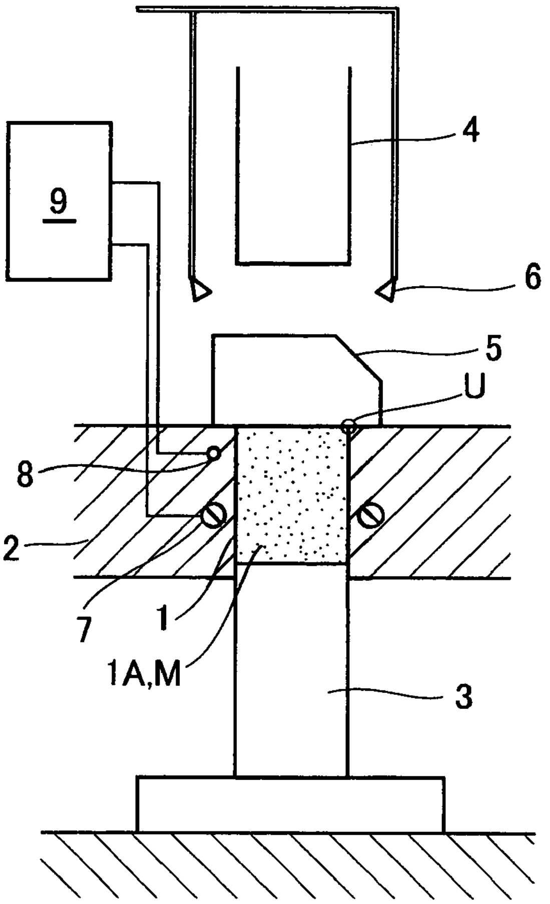
FIG. 8 is a schematic diagram showing a second process according to a third embodiment of the present invention.
Figure 8A:
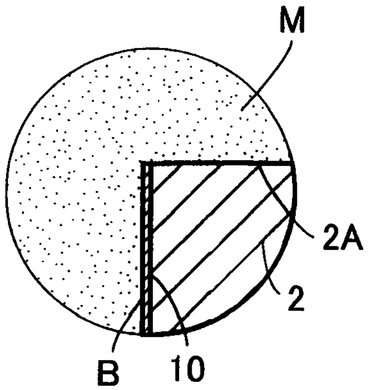
FIG. 8A is a partly enlarged cross-sectional view showing a part U of a die according to the third embodiment.

The compact A thus press-molded becomes ejectable when the die 2 is moved further downwardly until the upper surface of the die 2 becomes essentially as high as the upper surface of the lower punch 3, as illustrated in a fourth process shown in FIG. 4. When ejecting the same, the compact A is allowed to contact the crystallized layer B formed of the lubricant in a lubricated condition. After ejecting the compact A thus way, the first process is repeated and thus the solution L is applied to the molding portion 1A again to form the crystallized layer B, and then the raw powder M is filled into the molding portion 1A.

As is apparent from the foregoing, the surface 10 of the through-hole 1 is formed with the surface treatment layer 11 so as to have the smaller angle X of contact with the solution L than the angle Y of contact of the die 2 with the solution L, in accordance with the foregoing embodiment. Thus, when the solution L is applied, the wetting action of the solution L relative to the through-hole 1 is improved so that the solution L can be extended over the surface treatment layer 11, eventually over the entire surface of the through-hole 1. Consequently, the entire surface thereof can be formed with the crystallized layer B by performing water evaporation. As a result, high-density compacts A can be stably obtained.

Also, prior to filling the molding portion 1A with the raw powder M, the solution L with a lubricant dissolved in a solvent to a uniform phase is applied to the molding portion 1A, and then the solution L is evaporated to thereby form the crystallized layer B on the molding portion 1A. Thus, the fine crystallized layer B for lubrication is formed on the peripheral surface of the molding portion 1A, thereby enabling the reducing of a force required for ejecting the compact A from the molding portion 1A as well as the improving of the density thereof.

Next is a description of second and third embodiments with reference to FIGS. 5 and 6, 7 and 8, respectively, in which the same reference symbols as those in the first embodiment will be designated by the same symbols, and their repeated detailed description will be omitted.

According to the second embodiment, the upper surface 2A of the die 2 is formed with a surface treatment layer 21 by water repellency imparting treatment to the surface 2A for improving its liquid repelling ability (i.e., reducing the wetting action of the solution L) relative to the surface 2A, or by arranging water repellent material thereon. An angle Y' of contact of the surface treatment layer 21 relative to the solution L is larger than an angle X' of contact of the surface made from the material of the die 2 itself, or the surface 10 of the through-hole 1, relative to the solution L (i.e., Y'>X'), thus enabling the said wetting action to be reduced. The surface treatment layer 21 may be formed from silicone- or fluorine-based resin such as those including Si—H bond, C—H bond and etc., or from nonpolar substances, as shown in Table 3 below.

TABLE 3

Examples of Water Repellent Substances

| Water Repellent Bond elements or Water Repellent Substances | Approximate Ionicity of Bond | Principal Reason for Water Repellency |
|---|---|---|
| Re—H, Tc—H, Co—H, Ni—H, Cu—H, Ag—H, Hg—H | 1% | due to small ionicity (polarity) of bonds |
| Mo—H, Fe—H, Tl—H, Si—H | 3% | |
| H—C, P—C, Te—C, H—S, P—S, Te—S, H—I, P—I, Te—I, W—H, Cd—H, In—H | 4% | |
| B—C, As—C, Po—C, B—S, As—S, Po—S, B—I, As—I, Po—I, Nb—H, V—H, Cr—H, Zn—H, Ga—H, | 7% | |
| Re—C, Tc—C, Co—C, Ni—C, Cu—C, Ag—C, Hg—C, Pb—C, Sb—C, Bi—C, Re—S, Tc—S, Co—S, Ni—S, Cu—S, Ag—S, Hg—S, Pb—S, Sb—S, Bi—S, Re—I, Tc—I, Co—I, Ni—I, Cu—I, Ag—I, Hg—I, Pb—I, Sb—I, Bi—I, Be—H, Al—H, Ti—H, Ta—H, Mn—H, | 9% | |
| Mo—C, Fe—C, Tl—C, Si—C, Ge—C, Sn—C, Mo—S, Fe—S, Tl—S, Si—S, Ge—S, Sn—S, Mo—I, Fe—I, Tl—I, Si—I, Ge—I, Sn—I, Zr—H, Pa—H, U—H | 11% | |
| Nonpolar Substances In General | | due to being nonpolar |

According to the second embodiment, therefore, the automatic openable and closable valve is opened so that the solution L of the lubricant is sprayed from the spray member 6 and applied to the molding portion 1A of the die 2 that is pre-heated by the heater 7. At this moment, part of the solution L is likely to be attached to the upper surface 2A of the die 2. Nevertheless, the aforementioned angle Y' of contact of the solution L with the upper surface 2A on which the surface treatment layer 21 is provided, becomes larger than the angle X' of direct contact thereof with the die 2, whereby the solution L is allowed to be repelled, thus preventing the solution L to collect on the surface 2A.

As is apparent from the foregoing, since the upper surface 2A of the die 2 is formed with the surface treatment layer 21 so as to have the larger angle Y' of contact with the solution L than the angle X' of contact of the die 2 with the solution L, whereby the water repellent property on the upper surface 2A can be improved, making the solution L less likely to pile up or collect on the upper surface 2A (the surface treatment layer 21), thus preventing the solution L from collecting on the upper surface 2A (surface treatment layer 21), which in turn makes the raw powder M housed in the feeder 5 less likely to be contacted by the solution L, thereby enabling the raw powder M to be prevented from caking.

According to the third embodiment, above the through-hole 1 is provided the spray member 6 serving as a solution applying means for spraying the solution L so as to attach the same to the molding portion 1A. The spray member 6 is arranged so as to face the through-hole 1. The solution L contains components which improve the wetting action of the solution L relative to the surface 10 of the through-hole 1. The wetting action improving components are ones that can make the angle X" of contact of the solution L with the surface 10 smaller, such as surface acting agents. Alternatively, dispersion liquid produced by dispersing lubricant in water may be used instead of the solution L. In that case also, such dispersion liquid should contain wetting action improving components.

Thus, the automatically openable and closable valve is opened to apply the solution L of the lubricant by spraying from the spray member 6 to the molding portion 1A of the die 2 heated by the heater 7, with the lower punch 3 being fitted into the through-hole 1 to define the molding portion 1A. At this moment, the angle X" of contact of the solution L, which would become large without the wetting action improving components, is allowed to be small enough owing to the components, thus allowing the solution L to be prevented from being repelled, to thereby be applied to the entire surface 10 of the though-hole 1 and wet the same. As a result, the solution L is evaporated and dried out, and thus crystals are allowed to grow entirely around the surface treatment layer 11 of the through-hole 1, so that a crystallized layer B of the lubricant is uniformly formed.

As is apparent from the foregoing, since the solution L contains components which improve the wetting action in order to decrease the angle X" of contact with the surface 10, the wetting action of the solution L in the through-hole 1 is improved when the solution L is applied, thus allowing the solution L to be extended over the entire surface 10 of the though-hole 1, so that the solution L is evaporated and dried out to thereby allow the crystallized layer B to grow entirely, thus enabling the high-density compacts to be stably obtained.

Preferred examples and comparative examples will now be explained with reference to Table 4. In each of the preferred examples and comparative examples shown in Table 4, iron powders (average particle diameter: 90,, m) were used as the raw powder, and 7 g of the mixture of the raw powder was filled into a mold forming a cylindrical column having a 1 $cm^2$ pressurization area, and then compacts were formed at a forming pressure of 8 t/$cm^2$. In the preferred examples, 1% solution of dipotassium hydrogen phosphate as water-soluble lubricant was applied to the molding portion of the die coated with hydrophilic material and heated to 250° C., and then it was evaporated and dried out to form the crystallized layer, and then the raw powders were filled into this molding portion. In the comparative example 1, after the lubricant was applied to the molding portion of an ordinary die heated to 250° C., it was dried and then the raw powder was filled into this molding portion. In the comparative example 2, after the lubricant was applied to the molding portion of an ordinary die heated to 150° C., it was dried and then the raw powder was filled into the molding portion. The comparative example 3 is a case in which an ordinary die was heated to 150° C., and then the raw powder was filled into the molding portion without the application of lubricant. In either example, SKH-51 as typically employed for tool steel was used for the molding portion of such ordinary die.

TABLE 4

| | 1st ex. | 2nd ex. | 3rd ex. | 4th ex. | 5th ex. | 6th ex. | 1st c. ex. | 2nd c. ex. | 3rd c. ex. |
|---|---|---|---|---|---|---|---|---|---|
| Hydrophilic Bond Element | Al—O Ti—O | Al—O | Ti—O | Al—O Mg—O | Al—O Si—O | Al—O Ca—O | none | none | none |
| Components of Hydrophilic Coating | $Al_2O_3$ 60% $TiO_2$ 60% | $Al_2O_3$ | $TiO_2$ | Spinel | $Al_2O_3$ 60% $SiO_2$ 40% | $Al_2O_3$ 60% CaO 40% | none | none | none |
| Process for Hydrophilic Coating | Spray coating | Spray coating | Spray coating | Spray coating | Spray coating | Spray coating | none | none | none |
| Lubrication of Die | Yes | Yes | Yes | Yes | Yes | Yes | Yes | Yes | No |
| Forming Temperature | 250 deg C. | 250 deg C. | 250 deg C. | 250 deg C. | 250 deg C. | 250 deg C. | 250 deg C. | 150 deg C. | 150 deg C. |
| Forming Density | 7.68 g/cm$^3$ | 7.67 g/cm$^3$ | 7.68 g/cm$^3$ | 7.67 g/cm$^3$ | 7.68 g/cm$^3$ | 7.67 g/cm$^3$ | unformable | 7.58 g/cm$^3$ | unformable |

c. x.: comparative example

Comparison result from Table 4 indicates that powder molding was found impossible if it was performed at 250° C. using dies without the hydrophilic coating, due to the lubricant being nut fully attached to the molding portion. According to the preferred examples 1-6 where powder molding was performed, using dies with the hydrophilic coating, powder molding was found possible at temperature higher than 150° C., and it was found that high-density compacts denser than those formed at 150° C. can be obtained.

The invention claimed is:

1. A powder molding die apparatus for powder molding, comprising:

a die with a through-hole for forming a side of a compact, the through-hole being defined vertically through an upper surface of the die;

a lower punch to be fitted into the through-hole from beneath;

an upper punch to be fitted into the through-hole from above;

a lubricant applying means for applying a lubricant to the through-hole, said lubricant applying means allowing the lubricant to be applied to the through-hole prior to filling a Fe-based or Cu-based raw powder in the through-hole from above, with the lower punch being fitted therein, so that the upper punch is allowed to be fitted into the through-hole after filling the through-hole with the raw powder to form a compact, wherein the through-hole is surface-treated to have a hydrophilic property and formed so as to have a smaller angle of contact with the lubricant than an angle of contact of the die itself with the lubricant.

2. The powder molding die apparatus according to the claim 1, wherein said lubricant is either dispersion liquid or solution produced by dispersing or dissolving lubricant in water.

3. The powder molding die apparatus according to the claim 2, wherein said through-hole is surface-treated so as to have a surface treatment layer formed by the coating of oxide, fluoride, nitride, chloride, sulfide, bromide, iodide, carbide or hydroxide.

4. The powder molding die apparatus according to the claim 2, wherein said through-hole is surface-treated so as to have a surface treatment layer formed by subjecting a coating of titania or zinc oxide to photocatalytic reaction by means of irradiation of light.

5. The powder molding die apparatus according to the claim 2, wherein said through-hole is surface-treated so as to have a surface treatment layer formed by the creation of hydroxide by alkali or hydrothermal processing, or by sputterings with potassium ions or sodium ions.

6. The powder molding die apparatus according to the claim 2, wherein said through-hole is surface-treated so as to have a surface treatment layer formed by making use of change in surface tension of solution through the formation of fine pores on a surface.

7. The powder molding die apparatus according to the claim 1, wherein said through-hole is surface-treated so as to have a surface treatment layer formed by the coating of anyone of the group consisting of: Cs—F, Fr—F, K—F, Rb—F, Na—F, Ba—F, Ra—F, Li—F, Ca—F, Sr—F, Ac—F, lanthanoid-F, Mg—F, Y—F, Cs—O, Fr—O, Se—F, Hf—F, Th—F, K—O, Rb—O, Zr—F, Pa—F, U—F, Na—O, Ba—O, Ra—O, Be—F, Al—F, Ti—F, Ta—F, Mn—F, Li—O, Ca—O, Sr—O, Nb—F, V—F, Cr—F, Zn—F, Ga—F, Ac—O, lanthanoid-O, W—F, Cd—F, In—F, Mg—O, Y—O, Cs—O, Fr—O, Cs—N, Fr—N, Cs—Cl, Fr—Cl, Mo—F, Fe—F, Tl—F, Si—F, Ge—F, Sn—F, Se—O, Hf—O, Th—O, K—N, Rb—N, K—Cl, Rb—Cl, Re—F, Tc—F, Co—F, Ni—F, Cu—F, Ag—F, Hg—F, Pb—F, Sb—F, Bi—F, Zr—O, Pa—O, U—O, Na—N, Ba—N, Ra—N, Na—Cl, Ba—Cl, Ra—Cl, Cs—Br, Fr—Br, B—F, As—F, Po—F, Be—O, Al—O, Ti—O, Ta—O, Mn—O, Li—N, Ca—N, Sr—N, Li—Cl, Ca—Cl, Sr—Cl, K—Br, Rb—Br, P—F, Te—F, Nb—O, V—O, Cr—O, Zn—O, Ga—O, Ac—N, lanthanoid-N, Ac—Cl, lanthanoid-Cl, Na—Br, Ba—Br, Ra—Br, Ru—F, Os—F, Rh—F, Ir—F, Pd—F, Pt—F, At—F, W—O, Cd—O, In—O, Mg—N, Y—N, Cs—N, Fr—N, Mg—Cl, Y—Cl, Cs—Cl, Fr—Cl, Li—Br, Ca—Br, Sr—Br, Cs—S, Fr—C, Cs—C, Fr—S, Cs—I, Fr—I, Mo—O, Fe—O, Ti—O, Si—O, Ge—O, Sn—O, Se—N, Hf—N, Th—N, Sc—Cl, Hf—Cl, Th—Cl, Ac—Br, lanthanoid-Br, K—C, Rb—C, K—S, Rb—S, K—I, Rb—I, Au—F, Sc—F, Re—O, Tc—O, Co—O, Ni—O, Cu—O, Ag—O, Hg—O, Pb—O, Sb—O, Bi—O, Zr—N, Pa—N, U—N, Zr—Cl, Pa—Cl, U—Cl, Mg—Br, Y—Br, Na—C, Ba—C, Ra—C, Na—S, Ba—S, Ra—S, Na—I, Ba—I, Ra—I, B—O, As—O, Po—O, Be—N, Al—N, Ti—N, Ta—N, Mn—N, Be—Cl, Al—Cl, Ti—Cl, Ta—Cl, Mn—Cl, Se—Br, Hf—Br, Th—Br, Li—C, Ca—C, Sr—C, Li—S, Ca—S, Sr—S, Li—I, Ca—I, Sr—I, P—O, Te—O, Nb—N, V—N, Cr—N, Zn—N, Ga—N, Nb—Cl, V—Cl, Cr—Cl, Zn—Cl, Ga—Cl, Zr—Br, Pa—Br, U—Br, Ac—C, lanthanoid-C, Ac—S, lanthanoid-S, Ac—I, lanthanoid-I, Ru—O, Os—O, Rh—O, Ir—O, Pd—O, Pt—O, At—O, W—N, Cd—N, In—N, W—Cl, Cd—Cl, In—Cl, Be—Br, Al—Br, Ti—Br, Ta—Br, Mn—Br, Mg—C, Y—C, Cs—C, Fr—C, Mg—S, Y—S, Cs—S, Fr—S, Mg—I, Y—I, Cs—I, Fr—I, Mo—N, Fe—N, Tl—N, Si—N, Ge—N, Sn—N, Mo—Cl, Fe—Cl, Tl—Cl, Si—Cl, Ge—Cl, Sn—Cl, Nb—Br, V—Br, Cr—Br, Zn—Br, Ga—Br, Se—C, Hf—C, Th—C, Se—S, Hf—S, Th—S, Se—I, Hf—I, or Th—I.

8. The powder molding die apparatus according to the claim 2, wherein said through-hole is surface-treated so as to have a surface treatment layer formed by the coating of any-one of the group consisting of: Cs—F, Fr—F, K—F, Rb—F, Na—F, Ba—F, Ra—F, Li—F, Ca—F, Sr—F, Ac—F, lanthanoid-F, Mg—F, Y—F, Cs—O, Fr—O, Se—F, Hf—F, Th—F, K—O, Rb—O, Zr—F, Pa—F, U—F, Na—O, Ba—O, Ra—O, Be—F, Al—F, Ti—F, Ta—F, Mn—F, Li—O, Ca—O, Sr—O, Nb—F, V—F, Cr—F, Zn—F, Ga—F, Ac—O, lanthanoid-O, W—F, Cd—F, In—F, Mg—O, Y—O, Cs—O, Fr—O, Cs—N, Fr—N, Cs—Cl, Fr—Cl, Mo—F, Fe—F, Tl—F, Si—F, Ge—F, Sn—F, Se—O, Hf—O, Th—O, K—N, Rb—N, K—Cl, Rb—Cl, Re—F, Tc—F, Co—F, Ni—F, Cu—F, Ag—F, Hg—F, Pb—F, Sb—F, Bi—F, Zr—O, Pa—O, U—O, Na—N, Ba—N, Ra—N, Na—Cl, Ba—Cl, Ra—Cl, Cs—Br, Fr—Br, B—F, As—F, Po—F, Be—O, Al—O, Ti—O, Ta—O, Mn—O, Li—N, Ca—N, Sr—N, Li—Cl, Ca—Cl, Sr—Cl, K—Br, Rb—Br, P—F, Te—F, Nb—O, V—O, Cr—O, Zn—O, Ga—O, Ac—N, lanthanoid-N, Ac—Cl, lanthanoid-Cl, Na—Br, Ba—Br, Ra—Br, Ru—F, Os—F, Rh—F, Ir—F, Pd—F, Pt—F, At—F, W—O, Cd—O, In—O, Mg—N, Y—N, Cs—N, Fr—N, Mg—Cl, Y—Cl, Cs—Cl, Fr—Cl, Li—Br, Ca—Br, Sr—Br, Cs—C, Fr—C, Cs—S, Fr—S, Cs—I, Fr—I, Mo—O, Fe—O, Ti—O, Si—O, Ge—O, Sn—O, Se—N, Hf—N, Th—N, Sc—Cl, Hf—Cl, Th—Cl, Ac—Br, lanthanoid-Br, K—C, Rb—C, K—S, Rb—S, K—I, Rb—I, Au—F, Sc—F, Re—O, Tc—O, Co—O, Ni—O, Cu—O, Ag—O, Hg—O, Pb—O, Sb—O, Bi—O, Zr—N, Pa—N, U—N, Zr—Cl, Pa—Cl, U—Cl, Mg—Br, Y—Br, Na—C, Ba—C, Ra—C, Na—S, Ba—S, Ra—S, Na—I, Ba—I, Ra—I, B—O, As—O, Po—O, Be—N, Al—N, Ti—N, Ta—N, Mn—N, Be—Cl, Al—Cl, Ti—Cl, Ta—Cl, Mn—Cl, Se—Br, Hf—Br, Th—Br, Li—C, Ca—C, Sr—C, Li—S, Ca—S, Sr—S, Li—I, Ca—I, Sr—I, P—O, Te—O, Nb—N, V—N, Cr—N, Zn—N, Ga—N, Nb—Cl, V—Cl, Cr—Cl, Zn—Cl, Ga—Cl, Zr—Br, Pa—Br, U—Br, Ac—C, lanthanoid-C, Ac—S, lanthanoid-S, Ac—I, lanthanoid-I, Ru—O, Os—O, Rh—O, Ir—O, Pd—O, Pt—O, At—O, W—N, Cd—N, In—N, W—Cl, Cd—Cl, In—Cl, Be—Br, Al—Br, Ti—Br, Ta—Br, Mn—Br, Mg—C, Y—C, Cs—C, Fr—C, Mg—S, Y—S, Cs—S, Fr—S, Mg—I, Y—I, Cs—I, Fr—I, Mo—N, Fe—N, Tl—N, Si—N, Ge—N, Sn—N, Mo—Cl, Fe—Cl, Tl—Cl, Si—Cl, Ge—Cl, Sn—Cl, Nb—Br, V—Br, Cr—Br, Zn—Br, Ga—Br, Se—C, Hf—C, Th—C, Se—S, Hf—S, Th—S, Se—I, Hf—I, or Th—I.

* * * * *

UNITED STATES PATENT AND TRADEMARK OFFICE

CERTIFICATE OF CORRECTION

PATENT NO. : 7,585,165 B2
APPLICATION NO. : 10/547047
DATED : September 8, 2009
INVENTOR(S) : Nakai et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1048 days.

Signed and Sealed this

Fourteenth Day of September, 2010

David J. Kappos
*Director of the United States Patent and Trademark Office*